US008667273B1

(12) United States Patent
Billstrom et al.

(10) Patent No.: US 8,667,273 B1
(45) Date of Patent: Mar. 4, 2014

(54) INTELLIGENT FILE ENCRYPTION AND SECURE BACKUP SYSTEM

(76) Inventors: Leif Olov Billstrom, Alno (SE); Kurt Uno Lennartsson, San Jose, CA (US)

( * ) Notice: Subject to any disclaimer, the term of this patent is extended or adjusted under 35 U.S.C. 154(b) by 866 days.

(21) Appl. No.: 11/807,726

(22) Filed: May 30, 2007

Related U.S. Application Data

(60) Provisional application No. 60/809,661, filed on May 30, 2006.

(51) Int. Cl.
H04L 29/06 (2006.01)
(52) U.S. Cl.
USPC .......................................................... 713/165
(58) Field of Classification Search
USPC ............ 713/165, 167, 181; 707/640; 380/200
See application file for complete search history.

(56) References Cited

U.S. PATENT DOCUMENTS

| | | | | |
|---|---|---|---|---|
| 5,742,807 | A * | 4/1998 | Masinter ........................ | 707/610 |
| 6,249,866 | B1 * | 6/2001 | Brundrett et al. .............. | 713/165 |
| 6,378,071 | B1 * | 4/2002 | Sasaki et al. ................... | 713/165 |
| 6,463,535 | B1 | 10/2002 | Drews | |
| 6,983,365 | B1 | 1/2006 | Douceur et al. | |
| 7,003,672 | B2 * | 2/2006 | Angelo et al. ................. | 713/189 |
| 7,143,445 | B1 | 11/2006 | Ishiguro et al. | |
| 7,155,745 | B1 | 12/2006 | Shin et al. | |
| 7,275,244 | B1 | 9/2007 | Charles Bell et al. | |
| 7,319,751 | B2 * | 1/2008 | Kirichenko ..................... | 380/37 |
| 7,398,399 | B2 | 7/2008 | Palliyil et al. | |
| 7,792,300 | B1 * | 9/2010 | Caronni ......................... | 380/277 |
| 7,954,151 | B1 | 5/2011 | Nisbet et al. | |
| 8,160,989 | B1 | 4/2012 | Schneider et al. | |
| 8,280,905 | B2 | 10/2012 | Shields et al. | |
| 2002/0038296 | A1 | 3/2002 | Margolus et al. | |
| 2002/0107877 | A1 * | 8/2002 | Whiting et al. ................. | 707/204 |
| 2003/0021417 | A1 | 1/2003 | Vasic et al. | |
| 2003/0028761 | A1 | 2/2003 | Platt | |
| 2003/0051154 | A1 | 3/2003 | Barton et al. | |
| 2003/0188180 | A1 | 10/2003 | Overney | |
| 2004/0022390 | A1 * | 2/2004 | McDonald et al. ........... | 380/277 |
| 2004/0133657 | A1 * | 7/2004 | Smith et al. .................... | 709/219 |
| 2004/0143713 | A1 | 7/2004 | Niles et al. | |

(Continued)

OTHER PUBLICATIONS

"How Rsync Works A Practical Overview," http://web.archive.org/web/20060210112620/http:/rsync.samba.org/how-rsync-works.html, Accessed Oct. 27, 2010, 5 pages.

(Continued)

*Primary Examiner* — Ali Abyaneh
(74) *Attorney, Agent, or Firm* — Blakely, Sokoloff, Taylor & Zafman LLP; Judith A. Szepesi

(57) ABSTRACT

A method and apparatus for secure transparent backup and encryption of data including compression, elimination of redundant information, all working integrated whether data is stored locally or shared in networks. When data is shared in networks, several computers may access encrypted objects simultaneously with the same limitations as for non-encrypted objects. The method and apparatus can automatically and invisible take backups and can easily restore any object to the exact content as it existed for a selected point in time using a snapshot capability in combination with the user interface described that has its focus on making the use very easy for the end user. The invention offers security and performance enhancements when used with tables containing approved hashes for executables and other objects based on company policy and virus scanning. Specific objects may also be easily detected even if they are encrypted.

20 Claims, 9 Drawing Sheets

(56) References Cited

U.S. PATENT DOCUMENTS

| | | |
|---|---|---|
| 2004/0148306 A1 | 7/2004 | Moulton et al. |
| 2004/0158730 A1 | 8/2004 | Sarkar |
| 2004/0168058 A1 | 8/2004 | Margolus |
| 2004/0193904 A1 | 9/2004 | Asoh et al. |
| 2004/0236761 A1 | 11/2004 | Both |
| 2005/0027757 A1 | 2/2005 | Kiessig et al. |
| 2005/0076066 A1 | 4/2005 | Stakutis et al. |
| 2005/0108240 A1* | 5/2005 | Bolosky et al. ............... 707/9 |
| 2005/0131939 A1 | 6/2005 | Douglis et al. |
| 2005/0131961 A1 | 6/2005 | Margolus et al. |
| 2005/0132382 A1 | 6/2005 | McGuire et al. |
| 2005/0138081 A1* | 6/2005 | Alshab et al. ............... 707/200 |
| 2005/0177603 A1* | 8/2005 | Shavit ............... 707/204 |
| 2005/0195660 A1 | 9/2005 | Kavuri et al. |
| 2005/0226059 A1 | 10/2005 | Kavuri et al. |
| 2007/0150948 A1 | 6/2007 | De Spiegeleer |
| 2008/0059495 A1 | 3/2008 | Kiessig et al. |
| 2008/0256326 A1 | 10/2008 | Patterson et al. |
| 2008/0294860 A1 | 11/2008 | Stakutis et al. |
| 2009/0089337 A1 | 4/2009 | Perlin et al. |
| 2009/0178144 A1 | 7/2009 | Redlich et al. |
| 2012/0005245 A1 | 1/2012 | Ruiz-Velasco |

OTHER PUBLICATIONS

Heintze, Nevin, "Scalable Document Fingerprinting," <http://www.cs.cmu.edu/afs/cs/user/nch/www/koala/main.html>, Bell Laboratories, Oct. 3, 1996, pp. 1-10.

* cited by examiner

FIG 1(a-c) of 9
1. A
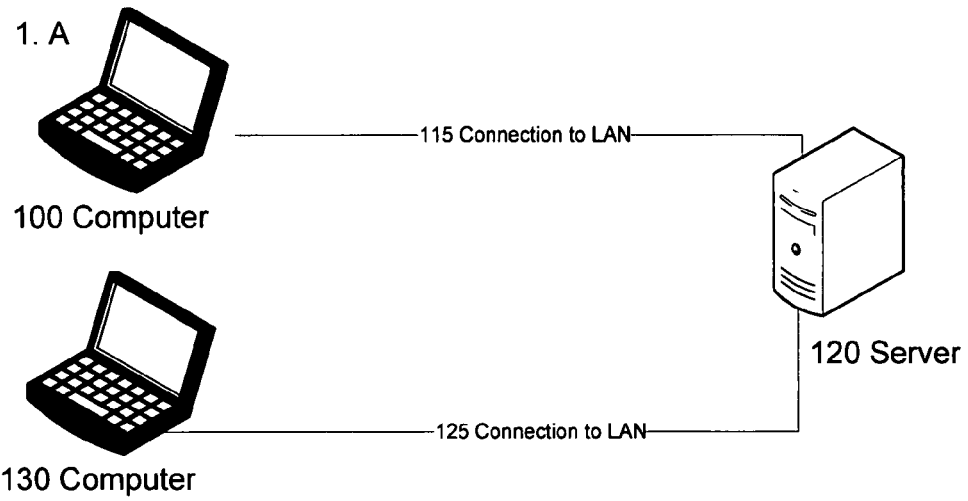
100 Computer
115 Connection to LAN
120 Server
125 Connection to LAN
130 Computer
1. B
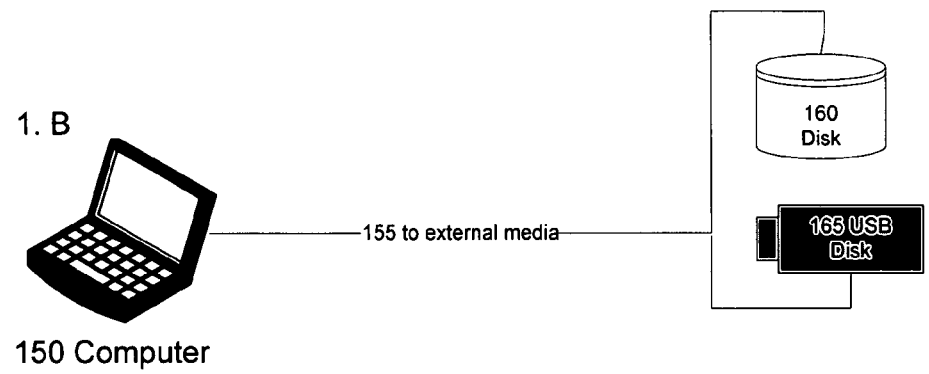
150 Computer
155 to external media
160 Disk
165 USB Disk
1. C
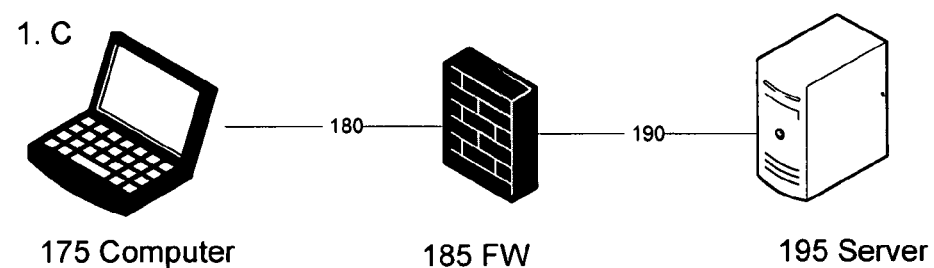
175 Computer
180
185 FW
190
195 Server

File and Metadata containers on backup storage

X10 (Metadata container)
400

X11 (Object Data container)

| 450 Data files stored by hashes as index |

| 455 File 1 Version 1 (Complete file) |

| 460 File 1 Version 2 (Diff, base = Version 1 + Data) |

| 465 File 1 Version 3 (Complete file) |

| 470 File 1 Version 4 (Diff, base = Version 2 + Data) |

| 475 File x Version y (other files, complete/differential file data) |

FIG 5 of 9

Description of structures

500 Metadata container

| 505<br>File Identification | 510<br>Hash | 515 (Valid time)<br>Start Date Time | 520 (Valid time)<br>End Date Time |
|---|---|---|---|
| C:\Documents\Doc1 | Hash A | 05/04/07 10.00 | Still valid |
| C:\Documents\Doc2 | Hash B | 05/04/07 10.03 | 05/04/07 11.45 |
| C:\Documents\Doc3 | Hash B | 05/04/07 09.00 | 05/04/07 10.30 |
| C:\Documents\Doc3 | Hash C | 05/04/07 10.30 | Still valid |
| C:\Documents\Doc4 | Hash B | 05/04/07 11.00 | 05/04/07 11.15 |
| C:\Documents\Doc4 | Hash D | 05/04/07 11.15 | Still valid |

525 Object Data container

| 530<br>ID | 535<br>Type+base | 540<br>Header | 545<br>Data |
|---|---|---|---|
| Hash A | Full | Header A | Block A1 ...... Block An  (complete file) |
| Hash B | Full | Header B | Block B1 ...... Block Bn  (complete file) |
| Hash C | Diff + Hash B | Header C | List of blocks that differs from B (only blocks that differs) |
| Hash D | Diff + Hash C | Header D | List of blocks that differs from C (only blocks that differs) |

550 Details of Object Data container

| 555<br>ID | 560<br>Type+base | 565<br>Header | 570<br>Data |
|---|---|---|---|
| Hash A | Full | Header A | Block A01,A02,A03,A04,A05,A06,A07 |
| Hash B | Full | Header B | Block B01,B02,B03,B04,B05,B06,B07 |
| Hash C | Diff + Hash B | Header C | 01=C01,07=C07 |
| Hash D | Diff + Hash C | Header D | 02=D02,07=D07 |

590 Full contents of files

| 592<br>ID | 594<br>Full data |
|---|---|
| Hash A | Block A01,A02,A03,A04,A05,A06,A07 |
| Hash B | Block B01,B02,B03,B04,B05,B06,B07 |
| Hash C | Block C01,B02,B03,B04,B05,B06,C07 |
| Hash D | Block C01,D02,B03,B04,B05,B06,D07 |

FIG 6 of 9

Encrypted and Compressed files

610 Regular file (A)

| 612 Header | 614 Data (Blocks) | 616 EOF |
|---|---|---|

620 Regular file details (B)

| 622 Header | 624 Data Block 1 | 626 Block 2 | 628 Block 3 |
|---|---|---|---|
| 630 Block 3 | 632 Block 3 | 634 EOF | |

640 Encrypted regular file (C)

| 642 Header | 644 Enc Data Block 1 | 646 Enc. Block 2 | 648 Enc. Block 3 |
|---|---|---|---|
| 650 Enc. Block 4 | 652 Enc. Block 5 | 654 Padding | 656 EOF |

660 Encrypted file with Compressed data blocks (D)

| 662 Hdr | 664 Cmpr Blk 1 | 668 C.B.2 | 670 C.B.3 | 672 C.B.4 | 674 C.B.5 | 676 Padd. | 678 EOF |
|---|---|---|---|---|---|---|---|

FIG 7 of 9

Compressible and direct access encrypted data blocks

710 Encrypted Data blocks

| 712 Encr. Data Block 1 | 714 Padding |
| --- | --- |

| 716 Encr. Data Block 2 | 718 Padding |
| --- | --- |

720 Regularly compressed blocks in a encrypted file

| 722 Compressed Data Block 1 | 724 Compressed Data Block 2 |
| --- | --- |

| 726 Compr Block 3 | 728 Compressed Data Block 4 | 730 Padding |
| --- | --- | --- |

740 Direct Accessible data blocks with Compression and Encryption

| Data Offset | 741 Header | |
| --- | --- | --- |
| 0 – 16383 | 742 Compressed Data Block 1 | 744 Padding |
| 16384 – 32767 | 746 Compressed Data Block 2 | 748 Padding |
| 32768 – 49151 | 750 Compressed Data Block 3 | 752 Padding |
| 49152 – 65535 | 754 Compressed Data Block 4 | 756 Padding |

Autosync of files and serverless backup

FIG 9 of 9
Autosync of files and serverless backup
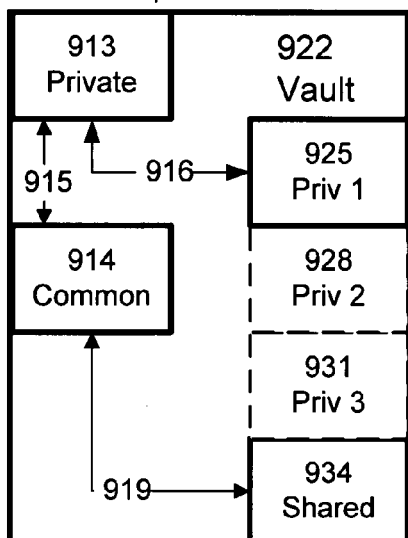
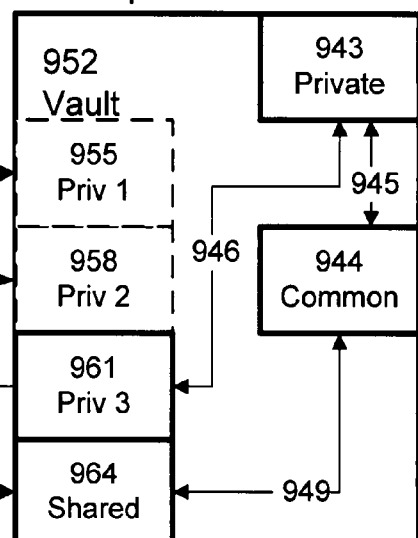
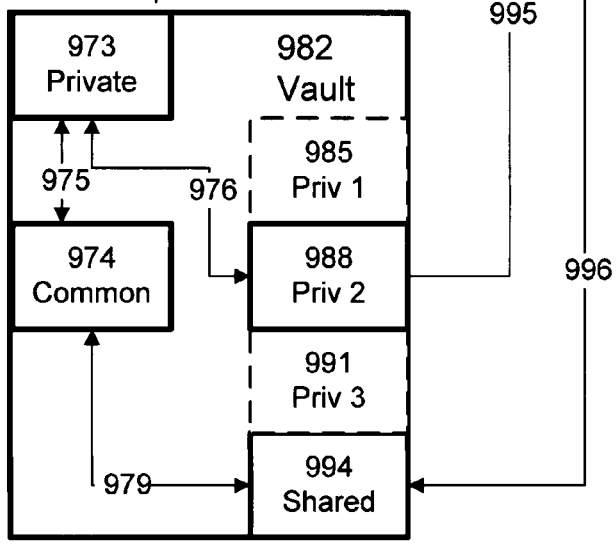

INTELLIGENT FILE ENCRYPTION AND SECURE BACKUP SYSTEM

COPYRIGHT NOTICE/PERMISSION

A portion of the disclosure of this patent document may contain material, which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data as described below, inclusive of the drawing figures where applicable: Copyright(c) 2006, 2007 by Leif O. Billström and Kurt U. Lennartsson.

CROSS REFERENCE TO RELATED APPLICATIONS

Not applicable

FIELD

Embodiments of this invention relate to data security, data management and data backup working as one unit in a computer system.

BACKGROUND OF THE INVENTION

Description of Related Art

Prior art, such as general data backup programs and general data encryption solutions don't generally work intelligently when used together. When looking at data backups only, they typically generate lots of duplicate data coming from single local data sources, and even worse when looking at backup systems in networked environments, where lots of data exists on many local systems but does not necessarily need to be backed up in multiple copies. Without encryption, backup systems often offer compression, and sometimes they also offer elimination of redundant data in backups, but with encryption where the same data can be encrypted using different keys, the problem is that current backup systems can neither compress encrypted data nor identify redundant information. This means that the same information is backed up over and over again.

To fully understand the problems with current solutions, the problems with encryption solutions and then the problems that arise when adding encryption to backups must be identified. There are two major encryption techniques frequently used on local computer systems, full disk encryption and file-by-file encryption, each with its own set of drawbacks.

The drawback with full disk encryption (encrypting/decrypting the data stream read or written to sectors on the local storage) is that once the operating system is up and running, data access is transparent to applications accessing the encrypted disk since the data is transparently decrypted as it is read from the disk and transparently encrypted before being written back to the disk. This means that whenever a backup is taken, the information has to be re-encrypted at the point at backup, since from the backup program's point of view none of the information appears encrypted. The backup encryption keys must be managed separately from the disk encryption keys. Full disk encryption thus provides transparent access for the authorized user, but offers no protection of information when copying files to servers for storage or sharing or when backing up data.

Looking at file-by-file encryption, the files are encrypted in the first place, so re-encryption is not necessary as long as the backup system can backup the files without decrypting them and in those cases where the keys are managed in a way that is suitable for backup. File encryption using symmetric encryption with symmetric keys and its key management integrated with the installed operating system do not create a foundation for robust solutions for making backups, and is thus not flexible enough for a smooth backup integration with encryption. File encryption does also not necessarily perform well in networked systems.

Using any of the described encryption methods prior to the current application, there are also common problems, such as sharing and encrypting files in networks, where sometimes multiple users need to access the same files simultaneously. Regardless of encryption, there is always the problem of efficiently backing up files where the same files frequently are stored in several places thus consuming space both on local and network storage as well as on the long time backup media. Backups are many times also difficult to fully restore to a specific date and time.

There are also other ways of encrypting files using separate programs for the encryption process. In such implementations, the method is not seamless to the user and there is an added manual handling of encryption keys. Data protected this way, would always be encrypted both on (server) shares and in backups, but won't permit simultaneous access for other users to copies on (server) shares. Such solutions cannot automatically eliminate redundant copies.

Independent of encryption method, the redundant copy elimination has not been possible in prior implementations when files have been encrypted on different computers and/or in combinations by different keys.

Many prior patents target antivirus issues and fast authorization of program access using hashing techniques as a way to identify known files and objects. In some patents the hashes are used for identification only, while in other patents the hashes are used as a way of reducing bandwidth before transportation to the central server for scanning.

Many patents discuss using hashes for identifying files by the hash only. This is also well known technology. Patents and articles that have been found in the same technology area cover only partial components of the current invention.

In U.S. Pat. No. 6,983,365, filed on Jan. 3, 2006, a method for Identifying and coalescing identical objects encrypted with different keys is presented. This application is targeting detection of identical objects encrypted with different keys. It describes a method to encrypt each object with its own representation, i.e. a HASH of the object. This hash is then encrypted with different keys, creating key items that are stored in cipher objects, and because the representation is used as encryption key it must be discarded for security reasons. When a clear text object is to be tested for identicalness it must first be encrypted using its own representation and then, as encrypted, be compared with the object to be tested with since the representation from the earlier encryption is discarded. In those cases where one of the keys used for the first object is available, the representation of the first object can be recreated by decrypting the corresponding key item. Actually in this patent, the data objects are encrypted with the same key as long as the objects are identical. The different keys the patent refers to are the keys that are used to encrypt that single encryption key. In U.S. Pat. Application On-disk file format for a serverless distributed file system, ideas are presented where files are divided into multiple blocks, each encrypted as described in U.S. Pat. No. 6,983, 365 (some of the inventors are the same). In this application hashes for verification of the blocks in a way more similar to the current invention is used, but the hash stored is covering the encrypted block and not the data before encryption like the current invention use for identification of identical blocks. In the referred application, in order to identify identical clear text blocks, the block to test must first be hashed, then encrypted and finally hashed once again before the hashes and identicalness can be verified, which significantly slows down the verification compared to the current invention's method of verification.

In U.S. Pat. Application No. 20050076066, Method, system, and program for retaining versions of files, a method for maintaining versions of files is presented as the system issues a creation of a versioned file name and copies the file to a file with this new name.

In U.S. Pat. Application No. 20050027757, System and method for managing versions, an object oriented file management database is described, managing versions of objects and documents in a database, mainly focusing on version management.

In U.S. Pat. Application No. 20040148306, Hash file system and method for use in a commonality factoring system, a solution for a hashed computer file system is presented based on hashes as identifiers, identifying the files/objects. As mentioned earlier, these techniques have been commonly known for several decades. Other applications by the same inventors exist, describing similar variants of their invention.

In U.S. Pat. Application No. 20030028761, Cryptographically signed file system, an invention is dedicated to DVR systems and used for validating data before use.

U.S. Pat. Application No. 20030021417, Hidden link dynamic key manager for use in computer systems with database structure for storage of encrypted data and method for storage and retrieval of encrypted data, describes an invention involving both a local and a remote cryptographic engine.

In U.S. Pat. Application No. 20050132382, System and method for updating files utilizing delta compression patching, the invention is dedicated for creating patches and updating installed software.

In U.S. Pat. Application No. 20050131961, Data repository and method for promoting network storage of data, Patent covering creating file name identifiers of fixed size (as hashes). It also describes how to connect file contents to those identifiers. This described method of building file pathnames as hashes including previously calculated hashes up to that node may be used in current invention's creation of metadata names, but are not required or indicated to be used. The referred patent also refers to connecting hashes to specific file contents, which is what the current invention uses in the data repository.

In U.S. Pat. Application No. 20050131939, Method and apparatus for data redundancy elimination at the block level, a method and apparatus for data redundancy elimination at the block level is presented to reduce redundancy of blocks in files and data objects by storing duplicate hashes (or super hashes) instead of duplicates of the referred blocks.

In European Pat. Application No. US2004236761, File system storage, is describing an implementation of a hierarchical file system of the B-tree structure like used in many ISAM database implementations where the key used is a hash value of the objects name.

In European Pat. No. US2005226059, Clustered hierarchical file services, an invention that relates to a system and method for a virtual cluster file server, which is far from what the current invention covers.

BRIEF SUMMARY OF THE INVENTION

A method and apparatus for securing files on a computer system and backing up only needed files, avoiding redundancy is described. The method in one embodiment includes giving an authenticated user transparent access to protected data and uses the same credentials to perform a secure backup of files. When sharing files in networks, in one embodiment files may be shared and used simultaneously by several users while still encrypted. Files in one embodiment can be restored to previous revisions or to a certain date and time. The implementation also permits data compression seamlessly integrated with the encryption.

The current invention in one embodiment is using file encryption integrated with the operating system in a novel way. The invention in one embodiment is using both symmetric keys for fast data encryption/decryption and public key encryption of keys on a per file basis, designed to offer robustness and security, both for backups and also for the normal use in companies with requirements to separate user access depending on group membership. The solution also offers seamless protection of files stored on external media such as USB tokens, where no (extra) user intervention is required for using such media.

Backup programs, which may in one embodiment be used with the invention, do not necessarily have to be designed to use encryption or the suggested key management. When looking at server implementations where many computers are connected and backing up data to the server, using the described technique, most advantages can also be achieved in combination with ordinary backup systems running on the server. The solution also offers simultaneous concurrent multi user access to files in networks, thus permitting encrypted files and databases to be shared. It also offers single instance storage of redundant data as well as in a unique way controlling the backed up data over time, and allowing instances of data to be restored to the exact revision of a specified date and time.

The hash calculation of file contents also makes it easy to create programs and functions added to the operating system that offers fast search and detection of duplicate files on storage media. By adding a component, in one embodiment, a file change detector, that monitors changes in the file system continuously recalculating hashes when needed and sorting the hashes in tables connected to the full name and location as seen by the operating system and user, searches for identical files are instantaneous. The same tables are also very useful in the described backup functionality.

BRIEF DESCRIPTION OF THE DRAWINGS

The current invention is illustrated by way of example, and not by way of limitation, in the figures of the accompanying drawings and in which like reference numerals refer to similar elements and in which:

FIG. 1 is a block diagram of one embodiment of a computer system in which the current invention may be used.

FIG. 5: Shows a more detailed sample view of the metadata structure for backups.

FIG. 6: Shows a detailed sample view of how the encryption is implemented.

FIG. 7: Shows a detailed sample view of how the compression is implemented.

FIG. 9: This drawing describes a similar situation as FIG. 8, but one computer is now isolated by a firewall. The computers and backups are in this case also protected by encryption.

DETAILED DESCRIPTION

Figure 2:
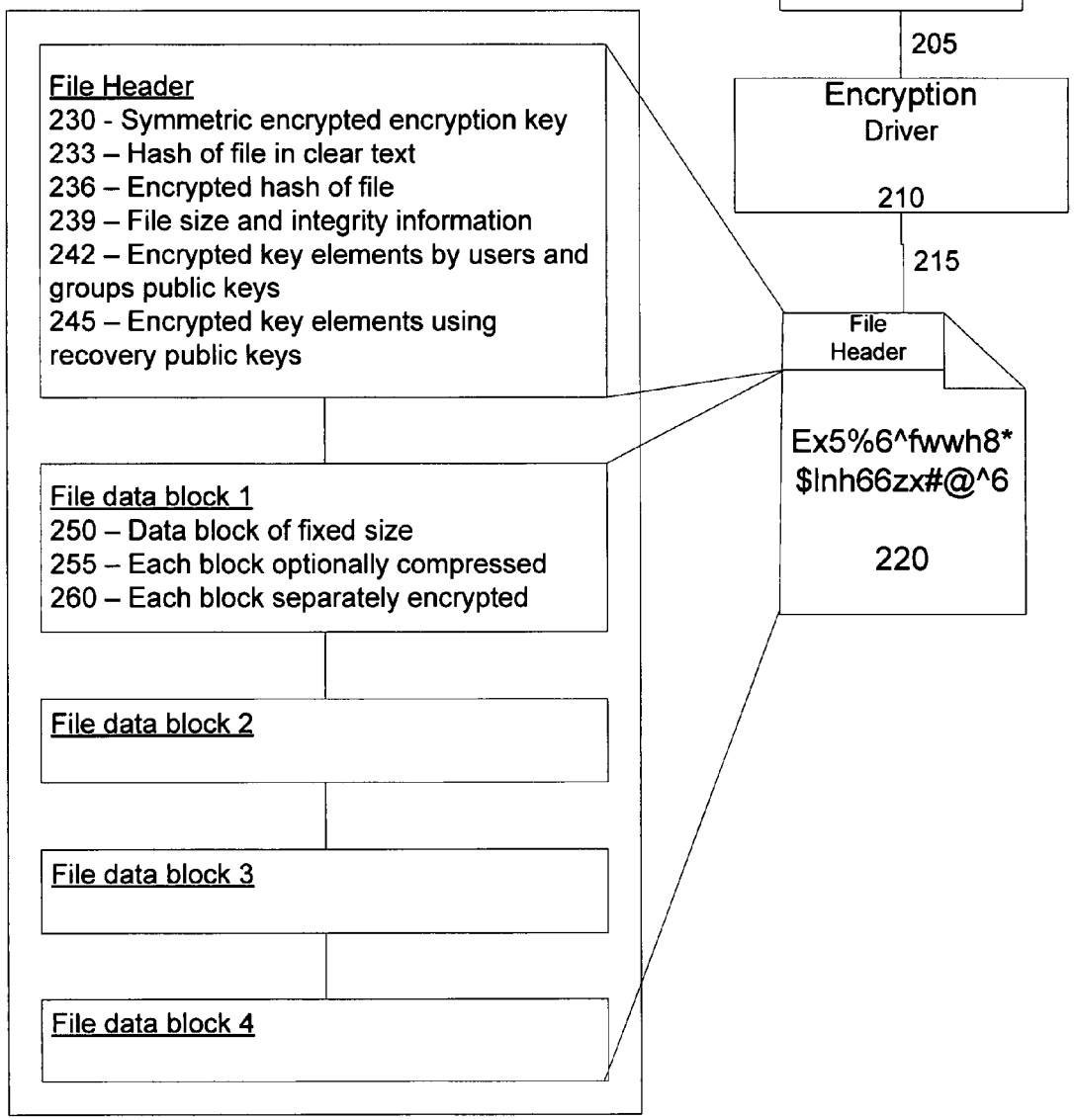
FIG. 2: Shows how a file is internally blocked into different sections and also contains a new header in one embodiment.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The current invention is described by way of example, and not by way of limitation. The following detailed description is, therefore, not to be taken in a limiting sense, and the scope of the present invention is defined only by the appended claims.

A method and apparatus for providing protection of files whether local or shared, backups of files eliminating redundant copies and a snapshot capability of files making it possible to restore any file, whether changed or not, to the exact revision of the file to a certain date and time is described. A user interface is also described that has its focus on making the use of the invention very easy for the end user.

The current invention relates to securing privacy and integrity of data and data backups of computer systems, and more specifically, by using a hashing technique to create a secure backup system that eliminates redundant file information allowing data to be securely stored on a standalone or networked system without backing up multiple copies of identical files. This hashing technique used in combination with adding a new file header to protected files allows data to be securely shared in a networked system without data redundancy. Furthermore, the invention allows for restoring data to a specific date and time and revisions of objects (such as files and databases) without having to store full images of each version. The system uses different technologies for the protection of objects to make the solution fast, reliable and flexible. Technologies include but are not limited to symmetric and asymmetric encryption techniques. Furthermore, the hashing technique offers possible verification of the integrity before using executable data such as executable programs even though they may be encrypted using different keys. Within companies, these hashes can easily secure the execution of approved programs, by maintaining a database with corresponding approved hashes for each approved program. The hashes can also be used together with antivirus systems to manage databases containing clear text hashes of scanned data and thus avoiding redundant time-consuming scanning of files by distributing those collections of hashes for scanned files.

The current invention describes a complete solution for securing information both concerning security by using encryption as well as safety/security by backup. The solution described in this application is also so easy to use regarding backups, restores, transportation, synchronization and encryption such that most users will be able to use it intuitively without any previous training or reading the manual.

The novelty with the current invention is that it combines a multitude of techniques to form a complete and secure system; security by using encryption of the data in a way that makes it possible to share encrypted files simultaneously by several users combined with redundancy elimination, where the elimination works for data when it is encrypted using identical or different keys. With data snapshots in time and also recovery possibilities and user rights to access files controlled by common public key cryptography techniques; the application is describing a complete and integrated system where all described parts are working together, forming a single, simple, unique and very easy to use powerful and secure computer system.

It is advantageous to provide a system that encrypts and secures user data transparently to authorized user(s) while eliminating access for all others, whether on a single system or a networked shared system. It would be even more advantageous if the same system also included a backup function, backing up encrypted data in such a way that it avoids backing up redundant data i.e. not storing multiple copies of same information.

It is also advantageous if such a system is easy to use. Users should not need to take several steps to back up their system. Instead it should be so easy to use after installing, so the user should not need to do anything more than just connect the backup device to the computer or have it connected all times without the need to wait long times while the backup process consumes much of the computers resources.

DEFINITION OF SOME TERMS

In this description, 'encryption' and 'decryption' are used frequently. Normal encryption and decryption methods may be used to implement this functionality, but encryption and decryption also denotes other means of transforming data from one form to another using an algorithm or formula for the transformation. Some algorithms use a 'key' that in those cases is just an identifier. The key denotes this identifier and encryption and decryption just denotes the direction of the transformation.

As described above, some transformation of data uses a key. This key is used, when the transformation is named symmetric encryption, to control the transformation both for encryption and decryption. When the transformation is named asymmetric encryption, the encryption transformation uses one key and the decryption transformation uses another key and where these keys must be used in pair to provide the means for the decryption to return the data into its original state.

A 'hash function' is a well-known technique for creating a small digital fingerprint from any size of data. It can be accomplished by using popular hashing methods such as MD5, SHA1 and other perhaps more or less-known hash calculations, encryptions, compressions or other numerical methods to create a binary identifier to represent the object. This object can be (but are not limited to) a string of data in transit, a data string in memory, in a database, a block in memory or on a storage media or a file. The methods for calculating hashes are many, and they can be combined in different ways. The quality of a hash computation can be good or bad. The described invention requires a good hash calculation with few hash collisions; i.e. having a very high probability that two generated hashes will not be the same for two different objects. Since the described invention in one embodiment also provides integrity protection in the form of encryption, the hash in one embodiment should be irreversible, making it impossible to reverse the hashing algorithm partly or fully to retrieve parts of the original object.

'Metadata' is also used frequently to denote additional information, derived from within the file, from the operating system or added by the user. This data is used to identify the target data (backup, identified by a hash) and may contain thumbnails, descriptions, locations where data has been stored, names of users data has been used by, date and time when data appeared and vanished (was created with this hash and deleted or modified). The metadata may contain other information as well that may be of use for searching, restoring and identifying purposes. Within the metadata there may also reside information of the expiration for the targeted data, and other archival parameters, although this is not required for this current invention.

'Shell extension' is also used and denotes some type of extended functionality to the operating system of the computer, enabling easy to use and operating system-like abilities to access and control the different components and functions of this invention. The shell extension may be implemented in different ways for different operating systems, and may in some environments be implemented as separate programs and in other environments be components adding seamless functionality to the installed operating system.

Constructing a binary tree is also a well-known technique like using it to construct an ISAM database, which stands for Index Sequential Access Method. The binary tree is used in the indexing part enabling fast searches using one or several indexed keys linked to the data records, each sorted and stored in a binary tree. The sequential part is accomplished by traversing the tree forward or backward to retrieve the next or previous ordered key and thus the data record. In the described invention the b-tree technique is used together with the hashing technique to store information efficiently in ways that has been used in such databases since more than 20 years, so this method is considered prior art.

FIG. 1: Shows some typical embodiments where the current invention may be used; FIG. 1A. Computers (100, 130) are connected within a LAN (115, 125) to a common server (120) using synchronization of files and backups. Files stored on the network server may be simultaneously shared among the computers (100, 130) where the encryption/decryption takes place locally on the devices and all information sent over the network (115, 125), through the network interface and stored on the server (120) always are encrypted. FIG. 1B. Computer (150) connected to different types of external storage media (160, 165) where files may be automatically backed up or synchronized to those media. FIG. 1C. Computer (175) connected through a firewall (185) to a server (195) backing up files encrypted on the server utilizing direct communication between client and server applications to offer very high security levels.

One Embodiment of File Encryption:

Files are encrypted together with a leading header. The header contains relevant key information used for backup purposes, sharing of information over the network and for permitting files to be sent by for example email or another distribution method to other users (using separate transport keys whenever the installed public keys are not sufficient).

The encryption of files for backup purpose does not require a driver, but the design of the header and also the internal structure of encrypted files are dependent on whether the backup is implemented together with a file encryption driver or if the backup or encryption are implemented as separate, standalone components. Since this invention targets a complete solution with encryption, sharing of files in networked environment and backups, all aspects combined to get an optimal solution are considered.

FIG. 2: Shows how in one embodiment a file contains a special header and internally is blocked into the different sections or blocks. The file (200) is seen by the application programs and the user as a normal file without any encryption or special header. In one embodiment this is accomplished by the encryption driver. A file request is sent through the operating system (205) to the encryption driver (210), which performs the actual encryption, and sends/receives encrypted information directed to the file through the operating system (215) accessing the encrypted file (220). This figure also outlines some of the information in the new file header structure with its different components of for (230-245), and the data, which is divided in logical data blocks, each optionally compressed and encrypted (250-260) either separately or together.

The described header contains hashes of the encrypted and clear text file content and also a hash of a major part of the header components. There is also information needed to manage the symmetric keys in a fast way. Some of the content in the encrypted header can include one or more of:

User file name (since the file may be stored under an encrypted filename). This name may be required in some implementations, but may be of no interest in others. When implemented, the encryption driver uses it transparently instead of the normally used name in the file system for accessing files. The encryption of the file system name is put in place for two reasons; 1. Different users and groups may store different files under the same logical name on same locations. 2. By encrypting this name, reading the directory without the encryption driver gives no clue to the files real name, which might indicate their contents. This file name in the header may itself be encrypted for protecting the files even more.

Hash of the unencrypted data (233). This hash is used for the redundant copy elimination in the backup part of the invention. It is calculated automatically by the driver as files are modified.

Hash of the encrypted data (236). This hash is also used in the redundant copy elimination in the backup part of the invention. It is used in the implementation of differential backups. The driver also calculates this hash automatically as files are modified.

Encrypted symmetric key (230), by local computer/user symmetric key. Since each file may be encrypted by a unique key, (even though it is not necessary for the functionality to have different keys,) this file encryption key must be encrypted with all other keys possible to use for decrypting this file. Considering speed of implementation, each computer uses a single symmetric key for encrypting the key of its or the current users files. This element is controlled by that computer or user key.

Encrypted symmetric keys (242), by key elements constructed using the public key encryption for other authorized entities such as users and groups.

Possible encrypted transport keys (245). These are also items constructed by encrypting the same file key, but with separate transport keys.

Recovery key(s). This is also constructed by encrypting the same file key, but with a separate recovery key(s).

Key verification information used to verify the integrity of the encryption key.

This header design, used in combination with the file encryption, permits very secure implementations of file encryption with a security level similar to full hard disk encryption, but still implemented in such a way that many of the problems with hard disk encryption are avoided. One important problem that is avoided is the need for loading drivers early in the logon phase, which often requires special drivers to be developed and implemented in conjunction with the encryption product. Attaching smart card readers and other devices for identification of the user in the pre-boot authentication are examples of such problematic areas.

One way to create such a secure implementation, but not the only way, is to encrypt all files on all disks. Different keys may be used for retrieval such as automatic boot keys used during the early boot process. Keys controlled and created by the installed operating system are used later during the booting process. Finally user private keys may be used directly after successful identification of the user.

In one embodiment, the hashes in the encrypted files headers are used for digital verification of the modules loaded at start from the earliest boot stage. Files loaded must have a correct hash before allowed to be used. Internal verification of the different steps involves using hashes to assure the security.

In this implementation, new drivers and files are only allowed to be installed when the operating system is running and all keys are in place. A separate boot recovery device or function may exist in case the operating system is damaged and needs to be repaired because it no longer can be loaded normally. Normal system restore and installation of programs are working well since those involve only files which were available when the system was running and as such, they are already encrypted and hashed.

Figure 3:
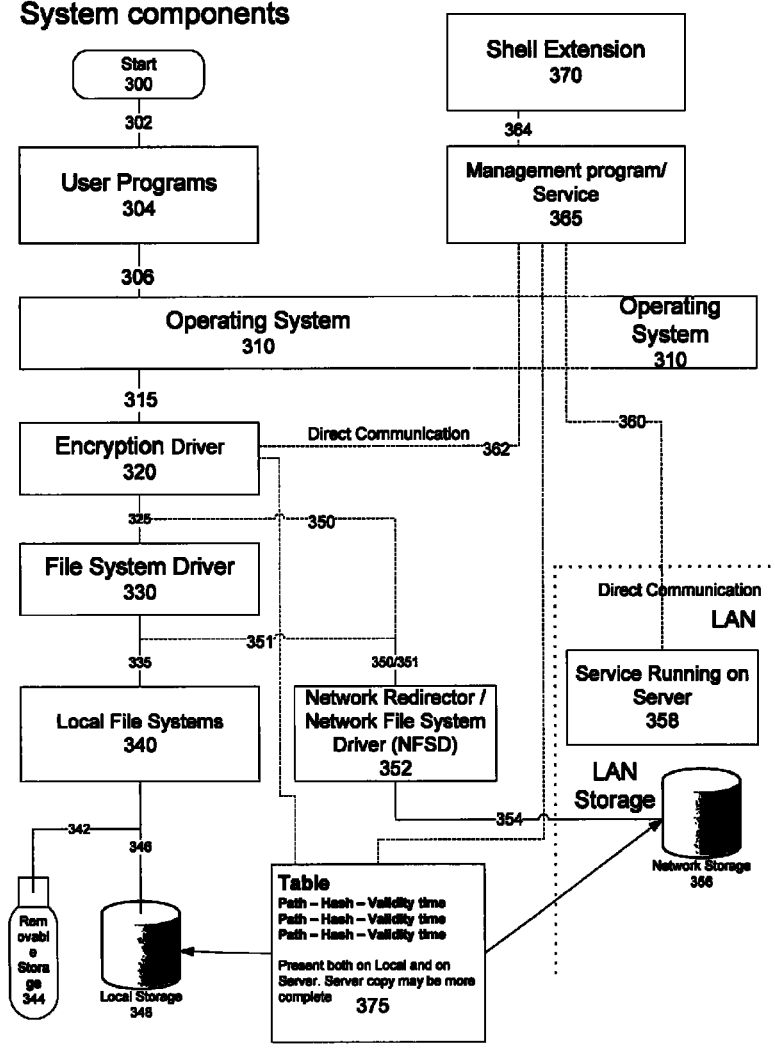
FIG. 3: This drawing shows one embodiment of how the encryption driver is implemented at the system level and the path of IO requests.

FIG. 3: Shows one embodiment of how the driver containing the encryption routine (320) is implemented and the path of IO requests. When the user program (304) reads information from the disk, an IO request is sent through the operating system (310) to the encryption driver (320). This driver uses the appropriate file system driver (330) for accessing data locally on a storage media (through 340) such as a USB token (344), any other removable media or a local disk (348). The access can also target files stored on a server using a Network Redirector or Network File System Driver (352). Depending on the installed operating system the storage path may take different ways (350, 351), but is always controlled by the encryption driver. Table (375) contains version specific information and hashes, making it possible to quickly find a specific version, and it also makes it possible for the management program/service component (365) to keep track of multiple references to identical files or, files encrypted with different keys, with the same file contents.

The user interface can be an extension to the system shell (370) or a separate management program/service (365) or a combination of both. The interface uses direct communication via the operating system (310) with the encryption driver as shown by (362) thus enabling direct control and access with the tables (375) as well as with the file content in encrypted form. When appropriate, communication may also exist with a running service (358) on the storage server. This direct communication is needed, in one embodiment, for the integration of the backup process together with the encryption.

The implementation also provides for integrated compression together with the encryption, thus saving space, especially important when files are sent over frequently congested internet connections. The compression is possible by logically splitting the file in blocks, compressing and encrypting those blocks separately. The benefit of this block-wise method is that large encrypted and compressed files may be shared over networks and accessed using direct access methods without the need of transferring the full file and decompress it. Each block may be transferred over the network using the underlying transfer protocols ability to perform compression.

This model of file encryption with an embedded file header is also well suited for usage with USB memory tokens and other portable storage containers, because regardless of the file system used on the storage media, all necessary information for the encryption and decryption is included in the file, i.e. the data and the key information is kept as a single unit and cannot accidentally be lost or mixed-up between files.

The file header contains as described above double hashes of the file data; one hash of the encrypted data makes it easy to verify the integrity of file contents, and the other hash of the unencrypted data makes it possible to eliminate redundant copies of files containing the same data. The unencrypted (or clear text) hash may be used together with antivirus systems for storing hashes of scanned files even though the files are encrypted using different keys and the keys are not available to the antivirus system. Those hashes may also be used to track 'illegal' or unwanted files, like pornographic files, that may be downloaded from the public internet and stored encrypted locally.

Files may be accessed sequentially or at random. For sequential access, compression, encryption and calculation of hashes is very straightforward and done in the following order during file creation;

1. Reserving space for the header.
2. Calculating clear text hash.
3. Compressing data.
4. Encrypting data.
5. Calculating encrypted hash.
6. Updating the header with hashes.

To permit direct access, files are handled in a different way. As mentioned in a section above, the file is logically divided in blocks where each block is compressed and encrypted as a unit. The process in one embodiment works the following way when a direct access file is created.

The header is created with empty hashes.

For each logical block, the clear text hash is calculated and logically added to the clear text hash in the header.

The data in each logical block is compressed individually; padding the rest of the block with compressible padding characters (e.g. null characters).

Only the actual data is encrypted, so the ending part of each logical block is left unencrypted and thus possible for transport protocols to compress since it will contain the padding.

For each logical block, the encrypted hash is then calculated and logically added to the encrypted hash in the header.

This management of the hashes makes it possible to perform direct data modifications in the file without corrupting the hashes.

When data is to be modified, the flow is;

The original logical data block is read from the file.

The encrypted hash is calculated for that block and logically subtracted from the encrypted hash in the header.

The data block is decrypted and then decompressed.

The clear text hash is calculated and logically subtracted from the clear text hash in the header.

For the new logical data block, the clear text hash is calculated and logically added to the clear text hash in the header.

The data in each logical block is compressed individually; padding the rest of the block with compressible padding characters (e.g. null characters).

Only the actual data is encrypted, so the ending part of each block is possible for transport protocols to compress since it will contain the padding.

For each logical block, the encrypted hash is then calculated and logically added to the encrypted hash in the header.

The two hash values (encrypted and clear hashes) may be implemented as a logical sum of all hashes for the individual blocks (as in the description above). In this case, when any block is to be modified, the old hashes are first logically subtracted from the hash fields and then the new block hashes are logically added. The requirement is that the logical additions and subtractions is a way to perform a type of arithmetic calculations on hashes such that the order of adding or subtracting hashes does not impact the final result. Ordinary addition will work, but the design accepts any other calculation methods fulfilling this requirement.

A different way to implement the hashes is to use a table of hashes with as many entries as logical blocks in the file. It may be easier to maintain integrity using this solution, but the solution also consumes extra space.

Integrity flags in the header are used to keep track of when files are being updated in one embodiment, so if the computer suddenly hangs, the integrity can automatically be checked and recalculated after restart.

Local hash tables are also updated with the calculated file hashes, in one embodiment. The mirroring, synchronization, backup and indexing services described later use these tables.

Embodiment Indexing Files:

Files are indexed in a way that makes it possible to keep track of multiple copies of the same files without storing redundant information. These indexing files are stored on the backup media (like server or removable/external disk). The index block contains information of file names and hashes for unencrypted and encrypted information. These hashes are then used to identify the data portion of the files. The data parts are stored in separate locations identified by the hashes only. Since the file contains all necessary information to decrypt the file, data can be restored even if the index information is lost. The indexing information is used to connect logical names in directories and/or for different time periods with the correct data content.

Partial or full copies of the indexing information may exist on the local computers to enable fast searches of backups without the need to have access to the backup media.

Using a shell extension in Microsoft Windows, or other similar techniques for other operating systems, the index files may be interpreted and shown in a way such that the user has no need to understand the underlying technique. Files are presented and used as they normally are used by the operating system.

Using a shell extension it is also possible, and very simple to implement a 'filter' permitting the user to choose some date and time in the past and "rewind" the content of storage locations such as directories and files to what the files looked like at the selected time and date. The shown directories and files can then be re-saved (i.e. restored) to other locations, or even the same location and used from that point on. When implemented in similar way as the ordinary operating system implements folders and files, the restore process will be easy to use even for inexperienced users.

Embodiment Eliminating Copies:

The indexing of files is, as previously mentioned, based on hashes identifying the file data and the encryption header. There are, as mentioned, hashes both for unencrypted and encrypted data. This makes it possible, using the hashes, to eliminate duplicate copies where the binary content is identical using the encrypted hash i.e. identical content protected with the same key.

The elimination also works when the data before encryption is identical, but the encryption is using a different symmetric key. This is possible using the unencrypted hash together with the public key information. Only the necessary header information has to be recreated to reflect the correct key information. The rest of the file data may be used in the same way as differential backups are handled, so the difference from the other file is only the header. In this way, the invention makes it possible to store only one copy of a file, even though the file may be a copy from a different computer or user and consequently is encrypted using a different symmetric key.

Backup:

Based on the above indexing description, the invention can further be used for disk-based backup applications and is elegantly simple in theory: "Back up less data". The invention creates point-in-time copies of data using the above described indexing of files, but significantly decreases the amount of data it writes to disk by eliminating duplicates and only writes changes to already backed-up files. A shell extension as explained at another section of this application might be used to implement this point-in-time functionality.

The underlying technology parses files and breaks them into chunks of configurable size that can be examined individually for changes, even for encrypted files, encrypted in a way as described in another section of the application. However, this technology works well only when files are encrypted using the same symmetric key, so differential file contents cannot be stored for a file with identical unencrypted contents if the file is encrypted using a different key.

In the case the whole file is encrypted with a different key it has to be fully backed-up, but later backups may be differential for this file. An alternative way is to create a set of double headers; one for the component encrypted with the first key and the other for the component created using the different key, but such an implementation is somewhat complex to implement and the gain may be too small to actually be beneficial to implement for many types of files.

All of the above embodiments are possible since all files have a set of public key information in the header. In one embodiment, all public key information are created targeting the same group of users, and in this case, there is no need to recreate the header for backups when different symmetric keys are used for encryption since the header already contains key information necessary to give access to the symmetric key for the same group of people even if the files are encrypted on different computers. In other embodiments, there may be a different set of users having access to the file depending on what computer it has been created on. In those cases when files are encrypted using different keys, for each duplicate file, there is a delta file created containing only the new header with the correct key information for that file's backup purpose.

Figure 4:
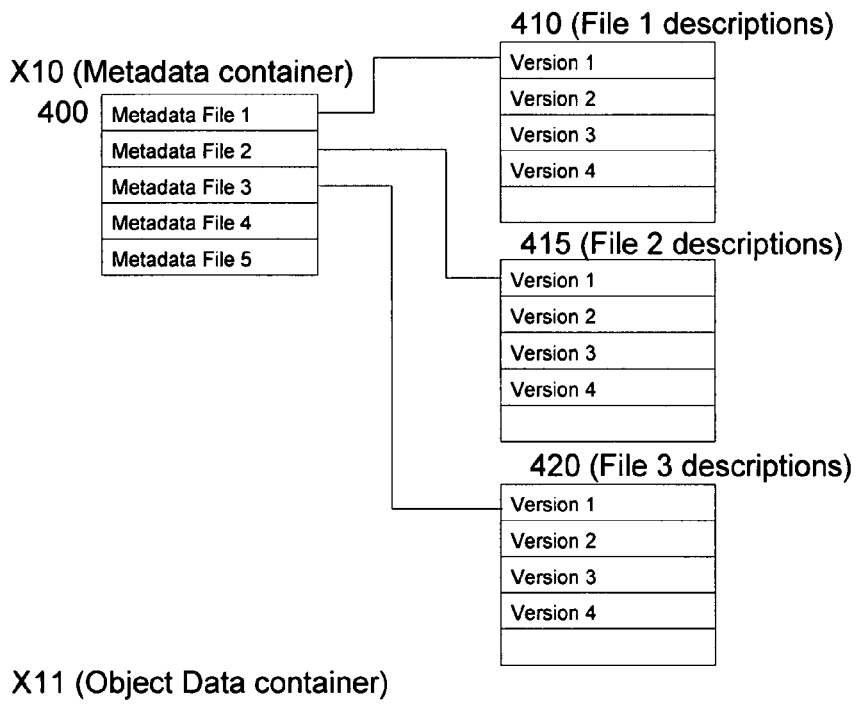
FIG. 4: Shows a sample of the file and metadata structure at the backup server.

FIG. 4: In this drawing can be seen the structure of one embodiment of the backup server. In metadata container X10 (may symbolize files in a directory structure, a database or another container type) there are references to all files that exist and previously existed on a computer. Each file (entry in 400) has a description of all recorded versions (410, 415, 420). Each such set of metadata may contain attributes like originating device, folder name, version, time stamps, thumbnail information and other search information describing the instance of the file that exists or existed at a specific earlier time. It also contains hash information connecting this info with the file data. In the object data container all unique files are stored (X11) in such a way that each unencrypted binary representation only has one copy meaning that several copies of the same file encrypted with different keys are reduced to a single copy as described in another section. This figure shows how different versions of files are stored. The base version 1 (455) stores the complete file. Version 2 (460) contains difference information based on version 1 and only the different data from that version. Version 3 (465) is a complete file and Version 4 (470) contains difference information based on version 2 and only the different data from that version.

FIG. 5: Shows one embodiment of details of the structures used for storing backups. The metadata container (500) may contain information about file directory information (505) i.e. the information found in the directory of the source location. There is also a hash (510) in one embodiment, which directly points out the backed up data in the object data container (525). There are also valid times in one embodiment indicating when the file was first detected (515) and when the file was detected as no longer present (520). This ending date and time information is set whenever the contents of the file is detected to be modified, or when the file is detected as removed. This valid time information is used to view historic contents of directories at specific times.

The object data container (525) contains the backed up data (files), stored under the given name, the hash of its content, or actually the hash of the unencrypted content together with the encrypted hash when encryption is used. Using this method, duplicates will be eliminated automatically, since a duplicate will have the same name (hash) as its original. There is also information about if this is a full copy or a differential copy (535) and in such case the base version for the differences. Since same file contents may be stored with different header information, the header may be stored separately (540). Then the backed up data is stored (545). For differential backups, only the differing blocks are stored with necessary merge information.

The object data container (550) shows a sample of two files stored as full backups, and two files stored as differential backups. Files A and B are full backups and are each composed of data blocks A01-A07 respectively B01-B07. File C shows a differential backup based on file B with only two blocks that are different (block 1 and 7). Finally file D shows a differential backup based on file C with only two blocks different (block 2 and 7). The complete contents of those four files can be seen in (590).

Embodiment Compression:

FIG. 7: Provides more details of one embodiment of how the compression is implemented.

In (710) a sample of two data blocks is shown, first compressed and filled with padding characters and then the data (712, 716) is encrypted but not the padding (714, 718). As seen, different compressed and encrypted information uses different amount of space (712 vs. 716). In an ordinary encrypted sequential file (720) the padding is never inserted during this process, so the possibility of determining sizes and offsets in the file are quickly lost without decrypting the whole file before accessing it. Depending of encryption methods, there may have to be some padding (730) in the last block in order to use block wise encryption. This type of file cannot be shared for update in networks or accessed simultaneously for update by multiple users.

To achieve multi user access, compression normally cannot be used since the access must permit direct addressing to specific positions in the file. In the current invention, direct accessing is possible on encrypted blocks, as described below.

Assume there is a block size of 512 bytes and byte 40000 should be changed in a file. First the block is read and decrypted (at offsets 39936-40447). After changing the byte at offset 64 in that block, it is encrypted again and rewritten.

In (740) another way to look at sequential files is described where the file is divided into blocks of fixed size and for each block it is compressed and encrypted. Each data block (742-744, 746-748, 750-752, 754-756) starts at its correct position, and since the padding (744, 748, 752, 756) is still there, such data blocks are compressible during the transfer between computers. They are also compressible by the underlying operating system if it supports compression. Larger blocks permits better compression and therefore, this example uses the larger block size of 16384 bytes. The same byte at offset 40000 is to be changed. With the block size of 16384, the block at 32768-49151 (750, 752) has to be read. This block is transferred over the network and the network protocol can compress the ending padding (752). Then the block is decrypted and decompressed locally on the computer. In this block the byte at offset 7232 is then updated. Finally the data is compressed, padded and encrypted such as the padding is left unencrypted and compressible. While writing back the data, network compression takes care of the padding.

As can be seen, the method described for (740) enables direct access to large network files without the need to transfer the whole file to decrypt it and still permitting compression of data. This function also permits simultaneous multi-user access from different computers to same files where record locking over the blocks is used to assure the functionality.

Embodiment Tables Containing Hashes and File Information:

Based on the indexing description above it is very useful, but not required for the invention to work, to create tables containing file hashes connected to file names and locations pointing to where those files exists on local fixed and removable storage media as well as for network media. Such tables are beneficial for the backup process and also for processes where searches for identical files are processed. Those tables are used for fast search of duplicates on the local computer. They are also used to quickly find files to send for backup without the need to scan all storage medias for changes at backup time. The file encryption driver maintains these local hash tables. In one embodiment, if the file encryption driver is not implemented, a separate program/component running in the background is updating the local hash tables, watching for modifications to files on attached devices. These tables makes it possible for automatic mirroring, synchronization and backups to start whenever the required medias for the appropriate function is available without the need for time and computer resource consuming functions to start for preparing of this function.

This particular technique for indexing also works between different users and computers since the hash of the unencrypted data is used, even though the encryption keys may be different on the different storage locations. The indexing also makes it possible to track where files have been at different times as well as by whom a file has been modified by. Although not required, the index blocks may contain additional user identification information, version information as well as information about the files existence in time with that hash or content (i.e. date and time when that file with that specific content was first detected and when the file was detected to contain some other content). An additional advantage is that it is very easy for a user to locate any exact duplicates that may exist of a file regardless of their location on physical media and even in time.

In one embodiment, on local computers, there is a table for each storage media. This table may be stored both on the storage media as well as on a fixed disk on the computer. In the table, there is a description for each file, connecting the file names, locations, file sizes and hashes. The hashes may be clear text hashes, encrypted hashes or both depending on the implementation. Using encrypted hashes, files containing similar contents and encrypted using the same keys are identified and located quickly. Using clear text hashes the same files can be found, unencrypted or even encrypted using different keys. These hashes may also be used in combination with antivirus systems to control whether files once have been scanned or not to make faster scanning possible.

In other embodiments, the structures may be different, but the functionality of connecting file hashes with file names and locations to give fast access to information is the main concept.

In one embodiment there is a program, a service or another component that constantly is monitoring files for modifications. When modifications are detected—i.e. when files are created, deleted or modified, required hashes are calculated and the tables updated in the background.

In other embodiments, such calculations may be started at certain points in time or initiated by the user in order to keep control of the processor usage and disk load.

When attaching removable media, the media is scanned and file sizes and times are compared to stored values in the tables and indexes are recalculated when necessary. For new media, new tables are created as required, and depending on settings stored or not stored on the media.

Embodiment Using Hashes for Fast Access in File Systems

File access speed can be significantly improved by using the hashes to create filenames of files stored in an ordinary file system. Metadata is used to connect the logical name of the object (file) to store. Several metadata files may target the same information i.e. the object stored under the name of its hashed value.

In one embodiment the metadata may reside in a specially designed file that offers flexible access and search possibilities to the attributes stored in the metadata. The correct hash identifies the data, stored as files named by their hash result in an ordinary file system.

The hashes of the data objects are first converted to a format with character representation appropriate to the file system. This can be made by converting the hash to names containing letters A-Z and number 0-9, some other characters or maybe restricting the filename to hexadecimal characters 0-9, A-F. The presented examples are chosen to use the hexadecimal representation, and the file name may look something like AF72D98E2C08E0D69E4E if the hash is of 80 bits.

Storing these objects in one single directory in an ordinary file system will cause slow performance in finding files when there are many files. In one embodiment, this can be solved by building a binary tree directory structure using two characters for each directory node. The design will be very fast by selecting an appropriate number of nodes that is sufficient for the number of objects to store. Let's say there are 1 million objects to store. Using only one subdirectory level, there will be roughly 3900 files (1000000/256) in each leaf-directory. Using two levels there will be roughly 15 files in each leaf-directory. The filename of the sample file stored in such a directory structure would be: [base directory]\AF\72\AF72D98E2C08E0D69E4E. In the leaf-node, the full hash is used in the filename, but it can be omitted since the leading characters AF72 were used in navigating the directory tree. If there are $10^{12}$ files there would be roughly 230 files in each leaf-node by using only four sublevels.

Using this directory structure it is very fast to search for a file. By knowing the name, just address the file directly, or by knowing the partial name, search from required level in the directory tree. Normally, there is no need to search for a file when the full name is not known since it has the name of the hash we are looking for.

This naming of files also has another benefit. It is very easy to verify the contents of all files in the file system by just scanning for files, and for each found file calculate the hash and compare the hash with the filename of itself.

By reserving some extra space in the file name (bits or bytes at the front or end of each filename), information can be stored about file compression, encryption or processing in another way, causing the hash of the full file to be different and therefore have to be processed differently. The hash may in this case reflect the contents of the file in its original state, while the extra information indicates what process needs to be performed to restore the file to its original state.

Differential files can be stored based on other files in a similar way by naming the file something like [full hash]_[base file hash] in the name. This information may of course be embedded in the file, but by composing the filename using those hashes, it is very simple and fast, by just looking at the filenames to find and retrieve files automatically during a restore process. The server that may be located at a distant location may automatically compose the restore information by collecting all needed files using the filenames only and never have to look at the file data, where the contents may be encoded in some way.

This server scenario may also include the hash of the file contents in its current state after the encoding process, such as encryption or compression. By doing this, the file name will contain the hash describing the files original contents as well as the hash of the encrypted file as it is stored in the file system. Using this second hash, programs scanning the files and directories in the backup can automatically verify the integrity of files by comparing the hashes of the files with the hash in its filename as previously described. In this implementation yet another but shorter hash in the filename may be used for hashing the filename itself such that the filename may be self-verified Embodiment Using Hashes for Intelligent Backup of Data A very intelligent backup system can be created by using the hashes to create filenames as described above, combined with functionality to keep track of all files stored on backup media, like tables of hashes. The backup system will work with any type of object, and as a sample implementation, a system with several computers and one single backup media attached to one computer at a time is described.

In one embodiment the backup media, such as a removable storage unit, is attached to a computer with a backup program installed using the metadata and the hashing technique. During a preparation phase this removable storage unit is assigned to store backups from the computer, e.g. some specific directories, some specific files or a combination of these and/or other parameters. By copying all unique files the backup is then processed to the backup media excluding already stored files. Simultaneously, a metadata structure (file or database) is maintained on both the backup media and on the local computer. On the backup for backup purposes, and on the local computer for fast information retrieval of backed-up files and retrieval of information on what media they are stored.

Later, this backup media is attached to another computer and a similar setup process is performed on this computer. For this computer, another metadata database is created, describing the backup settings, the information file of this computer binds it to this backup media. Files are copied, but since the files are stored under the names of their data contents i.e. the hash, it is very fast for the backup program to identify already stored files on the media, and only copy missing files. The metadata of course is updated for all objects covered by the backup.

The same process is repeated for each computer included in this example. There will be a number of metadata databases but only one copy of each unique data object. It is fast to decide if an object already exists on the backup media by just testing for existence of the filename. Even so, it may be preferable to have a common table, database or data structure stored solely on the backup media, containing all hashes for those objects that are stored on the media. By loading this table at the start of the backup process, the decision of whether or not there are any missing objects on the backup media can be made much faster.

Embodiment Using Hashes for Intelligent Mirroring of Objects:

The hash tables described above may be used for intelligent mirroring of files. In this embodiment hash tables are used on each media, containing names and hashes for all files on that media.

After the initial setup of this functionality where there is defined from what source and to what destination the mirroring should take place, each file will be immediately mirrored (or after some delay set in the setup process). The mirrored place will contain a copy of the original location, and that copy will be maintained automatically.

Assume there is a USB- or other removable storage device that is attached to the computer. If this device already is prepared, it will contain the hash table of its contents. When detecting this device arrival, the mirroring process will immediately load and verify the hash table from the device and after a fast analysis of both the hash tables, for the source and destination, start copying the missing files and update the hash table on the device.

This device can later be moved to another computer where the same process will be performed, thus copying only files not already existing, even when they are copied from another computer.

An option is to not store any hash or metadata information on the removable device in order to save space and just store it locally on the local computer, but then the device cannot easily be moved to another computer for updating of the files.

Embodiment Using Hashes for Intelligent Synchronization of Objects:

The described methods above covering intelligent backup and mirroring of information using hashes may also be applied to an implementation covering synchronization of data. As mentioned in a section above, they are not limited to computer systems and files, but the examples use the same setup as used in the backup system described above. Several computers share the same synchronization media, which may be, but are not limited to be, the same media as used for the backup process.

After setting up the system for synchronization, the same storing of objects and metadata may be accomplished as during the backup process. Unwanted redundant storage of copies is avoided. The added functionality is a description of contents such as folders, folder trees or other objects stored describing what to synchronize. This information may be stored on both the media and on the computer, only on the media, or only on the local computer depending on the implementation. Another added object is a database on the backup media containing the metadata for all objects covered by the synchronization. This database is common for all computers to be synchronized and is therefore unlikely to be stored on any of the local computers.

During the synchronization process, there will first be a backup step executed in order to preserve the contents of the computer. This optionally allows the synchronization to be reversed fully or partially. After the backup is completed, the synchronization starts, where the metadata information for the local objects such as files are compared between the computer, the common database and the backup database in order for the synchronization process to decide how to update both places to the latest version. During this process, in one embodiment messages may be presented to the user if contradicting information is found for some objects.

Whenever the media is attached to another computer, the same process is started and the files are updated on both the computer and on the removable device.

The backup/synchronization media may be any type of removable storage media like USB storage devices, Fire Wire attached storage, Bluetooth attached storage, network attached wired or wireless storage, or any other media. In one embodiment the user carries a portable storage device like a USB-token where information is synchronized when traveling between multiple work places such as home and the office.

Figure 8:
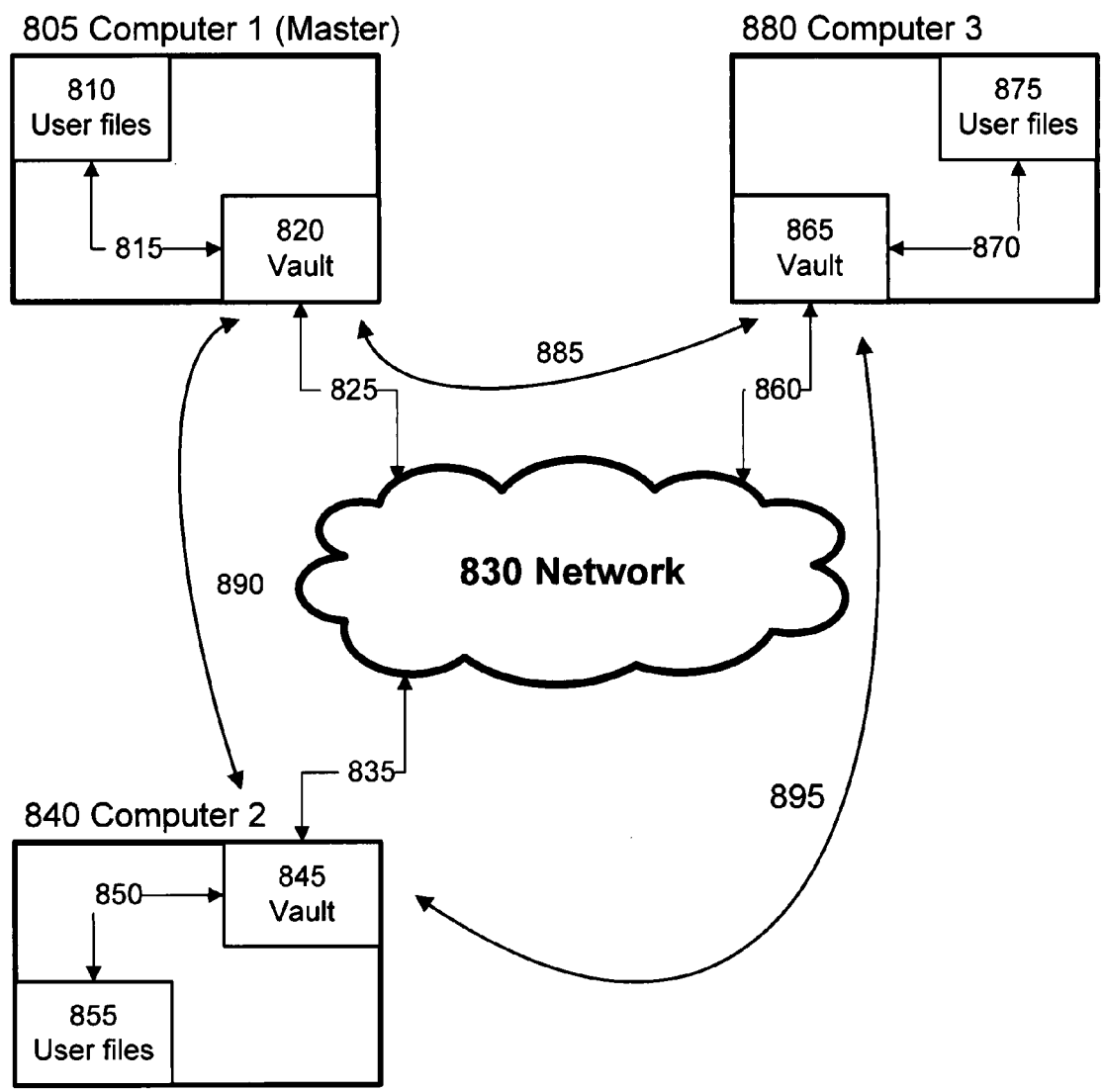
FIG. 8: This drawing describes a local network with three computers connected, where synchronization of data between the computers are used in combination with backing up information from all three to each of the individual computers.

Embodiment Mirror and Backup in Combination:

FIG. 8: In one embodiment the mirroring may be implemented in a small office where no dedicated server exists and there are no removable media. Mirroring is instead used internally between connected computers directly within the network, in one embodiment. Backups are also stored on all computers such that each computer contains a backup for every, or a selected set of attached computers, in the network. In large network with many computers, small backup sets of computers may be defined in order to avoid large backup sets; i.e. a computer may be backed up to only two others, not to all others.

There are three computers (805, 840, 880) connected to the network (830) by connections (825, 835, 860). Communication is direct between the computers (885, 890, 895). Of course, this direct communication may be wireline, wireless, or use any other protocol.

In one embodiment, one computer can be the master (805) such that all synchronization and backup from the others must pass that one. In another embodiment, all computers are set as peers and communicate directly between them (as in this example).

On each of the three computers, there are definitions of the areas to be synchronized and backed up (810, 855, 875). There are also definitions where the backup vaults are (820, 845, 865).

The backup will work internally on each computer between the defined area and the backup vault (815, 850, 870).

The mirroring will work directly between the computers by sending hashes and metadata between the computers describing changes to the structures. When necessary, the data files (hashed file) are also transferred over appropriate connections.

Files and changes stored on one computer will be synchronized to the others when they are connected. Any computer can be disconnected from the network and used on other places without any preparation. When they later are reconnected to the network, the mirroring and backup will start and very quickly synchronize all to the latest state.

If files are deleted by mistake, the deletion will be mirrored to all computers, but since all computers also have a backup vault where files may stay for very long time and versions of the file are stored, they can be restored regardless of whether the files are present or not in current directory structure or if the computer at that point in time is connected or not to the network. In one embodiment files can be made read-only in such a way that files cannot be deleted.

The synchronization itself may use communication by sending files to the other computers communication directories or by sending messages directly between the applications.

FIG. 9: Describes another embodiment where the computers are located on different sides of a firewall, (910, 940) on one side and (970) on the other. The different sides handle different type of information and the requirement is now to use encryption to secure data between the sections. Backups must be encrypted and it is preferable but not necessary to have the encryption driver installed because with the driver installed all files may be encrypted. Without the encryption driver the backup program/service will take care of the encryption and since the format of the header is identical for driver encrypted files and backup encrypted files, any computer may or may not have the encryption driver installed.

The common locations are shared between all three computers (914, 944, 974) where files stored will be mirrored to the other locations and accessible for all others and does not need to be encrypted (for protection from the other computer users). Those common areas are synchronized between the computers and (934, 964, 994) functions as backups.

In one embodiment, there may be private areas on each computer that will be backed up on all computers. For those private files a private master key will be used such that no one else can decrypt the files. Private area (913) is backed up on (925, 955) and common area (914) is backed up on (934, 964, 994). Private area (943) is backed up on (961, 931) and common area (944) is backed up on (934, 964, 994). Private area (973) is backed up on (988) and on the other side of the firewall on (928, 958). Common area (974) is backed up on (934, 964, 994).

All backups are encrypted either by private keys or by a common key or a combination if additional keys are used.

Objects can be copied between the private areas (913, 943, 973) and common areas (915, 945, 975) and there are direct communication between the computers. This may be done in one embodiment either using files shares, or better directly over a reserved TCP-port or other direct or indirect communication channel.

On (910) files backed-up from (913) will be stored encrypted with a private key on (925, 955) and files from (914) will be encrypted using a common key on (934, 964, 994). The same applies for (943) with private key on (931, 961) and (944) with common key on (934, 964, 994). The same applies for (973) with private key on (988, 928, 958) and (974) with common key on (934, 964, 994).

The implementation works efficiently, automatically and securely where a smaller set of data can be easily shared.

With this function a notification with verification from the user may be invoked before any file leaves the local computer to be synchronized on the others, since a file may easily be copied to the wrong place.

For mirroring, synchronization and backup, the media may be locally attached, attached in a LAN or attached over the internet. The transport of files may be differently implemented depending on the connection type. For locally attached media, the media may be an unintelligent storage device or an intelligent device, keeping track of locally stored files and metadata. In a LAN, in a server implementation, one way is to store files on shared volumes on the server, while another, more secure way is to have a server component as well as a client component running where the server component functions in a way similar to the locally attached intelligent storage media in such a way that files and commands are interchanged between the computers and server offering protection of the stored files such that any malfunctioning computer cannot damage the backup.

Over internet connections a similar client/server implementation as described above can be used. The connections can be direct between computers-storage servers over dedicated communication channels such as especially dedicated ports or by using communication by storing files containing requests and answers on commonly accessible connection points. Backups this way should be ideal for small workgroups spread out in areas and working on common projects for different employers.

Using some type of manipulation of the data like compression, encryption or delta-processing of files, the data transferred can be reduced in size as well as extra protected against information leeks when using the public internet as communication backbone.

Embodiment Improving Differential Backup Solutions:

As mentioned above, the functionality of differential backups is addressed. At a first look, it may be difficult to find much difference in functionality from existing solutions, but as is shown, there are significant improvements using the methods described above even in those cases where compression and encryption are not used. The following embodiment will now show some of the highlights.

In the metadata database (or container) all attributes, found in the directories for the files are backed up such as file attributes, sizes and dates. These attributes are for informational use only and not really needed for the recovery process. For each file and directory there may exist many entries in the database. There is one entry for each backed up version of a file. Together with this information there is also stored information at what time and date this file appeared and disappeared. Since this entry is valid for one hash (binary version) of the content, the dates give us information of when files were modified, and when new entries were created in the database.

A process constantly monitoring the file system for changes and capturing each change may continuously update the metadata database. This process may also take continuous copies of modifications and store them locally in a temporary directory. The copies of changed files may also be taken at predefined time intervals.

When the backup device is attached, all those temporary files not existing on the backup media may be transferred and the metadata databases merged.

When restoring files, the contents may be restored to a content that existed at a specific time, or that has existed at another time over a time period, such that all files that existed at some point of time during that period can be restored. A directory containing files may have been deleted at some time, but using described functionality, even the deleted files may be found and restored. For previous implementations of differential backups there is a problem that multiple versions have to be merged to get a full image to restore, and when restoring such images, files and directories that existed at some point in time, but have since then been deleted are often restored. In one embodiment, since all files are stored under their hash names, no information is stored in multiple copies regardless whether they existed during different time periods, under different names or at different locations in the file system.

Embodiment for Fully Automated Backups:

For many users, the complexity of set up procedures for making a backup is too complicated or too time-consuming. Later when backups are to be taken there is a backup program to start, some commands to execute and some decisions to make that makes it to tedious to backup frequently. The same problem exists regarding the user interface to restore files. Very often, they are not designed in a way that seems natural to users that may be somewhat inexperienced in working with computers. This embodiment will greatly increase their ability to keep current backups, This embodiment is based on the previously described mirroring, synchronization and backup systems. There is now a dedicated process or service that is constantly running on the local computer, monitoring changes to the file system and keeping track of the changes. This service is constantly taking hashes of the local files and updating a local database. This process is also monitoring devices attached or removed and will start the predefined functionality automatically whenever the storage media is attached—without any user intervention at all.

When the device is attached, it is identified as a media for one or more of the backup, mirroring or synchronizing functions. The desired functions starts immediately without any noticeable impact for the user, where information of what is going on may or may not be presented as an information balloon in the tray like backup started and backup completed.

A removable device such as a Bluetooth or Wi-Fi device can be used. If so, the device will automatically take backups whenever the computer is within communication range, in one embodiment. Using backups over the public internet this way, the user never have to make any more backup decisions and never have to loose a file.

This function may seem a bit scary since there is no need to perform any identification of the authority for the automated backup to start. If files are stored without any encryption or protection, the backup media has to be handled with extreme care since it may contain proprietary or secret information.

In one embodiment the files are encrypted before they are stored to the backup media. The local computer may be efficiently protected by other means, but the backup, synchronize or mirror media has to be encrypted. In this embodiment there is a common key used for the encryption. By using the same key for several computers, the non-duplicated storage that the solution offers will be beneficial. In order for this function to work automatically, the secret key may be stored on the local computer. i.e. the same secret key may be stored on all computers (in case of symmetric encryption). The backup media is secured by encryption this way in case it is lost or stolen.

User Interface:

During the restore process the current invention offers a user interface integrated with the operating system user interface. Looking at Microsoft Windows operating system as an example, the restore interface is implemented as a shell extension where the backed up files are presented in an explorer view similar to the ordinary explorer view. Files can be dragged and dropped from the backup folder structure to any place on the local disk, like moving files under the ordinary operating system. For files whose binary representation already exists locally on the computer (found easily using the hash calculation process) the restore is just a local file copy, while other files have to be retrieved from the backup media, either using the locally attached storage unit or by accessing the remote backup device using the network, internet or other communication method/device. Files will be restored in due time in the background.

At some point the user may need to restore files to a specific version of the file (version existing at a specific time). This is made easily by offering a time slider somewhere in the explorer window, for example on the right side of the toolbar. By dragging the slider to a specific time, all shown items will reflect the situation at that point in time. In an extended version it may be beneficial to have a start and end point in time and all files that existed within that time interval may be shown and are possible to restore.

As another extension to the normal shell, the user can right click on an item in the ordinary file system view, choosing backups and select to restore a specific version of that item either to the original location or to another location. In implementations where there are lots of local disk space there may be a local store of copies under the hashed names. Users can choose to restore files and directories to any version without the need to previously copy those to other locations, an action frequently performed by many users. This will save both valuable time for users and storage space.

In the modified explorer view and also in the normal explorer view it may be of interest to indicate what files that have copies on other locations on the computer as well as where they exist and if they are backed up. This can be performed in a similar way as the shortcut icons are tagged in Windows today, but with another symbol like for example a colored dot. By right clicking on such an object, all exact duplicates existing on the disk, and perhaps also on other media and backups are shown to the user in a submenu of this context menu. It may be possible to navigate to those locations where they are found by just selecting that submenu item.

The hashing technique in combination with this user interface offers extended search capabilities when searching backups for files. Assume the user is searching for a file, but does not remember the file name or where it was stored and does not even remember at what time it was stored on the computer. The only thing known is that at some place and point in time another file was present. The user can then search for this other file, finding where any of its different versions or if required a specific version has been present at different times. After changing to that directory (which may or may not exist now) and the user then sets the starting and ending time for that view to show every file that has ever existed on that location. From that point, files can be restored and investigated until the correct file is found.

Extreme and Easy to Use Security:

Normally it may seem enough to have just one backup. As mentioned previously, the complexity of backing up the computer files scares many people and keeps them from using this service. With the solution of the current invention the back up can even be improved.

In this embodiment a users may have the need for utmost security and safety. One safe copy must always be in the security box at the bank office and the requirement is that backups must be immediately available in close proximity to the computer.

In this example, three identical backup schemes are scheduled, such as the above described versions, are set up. When the first backup is made, that device is disconnected and transported to the bank vault.

The next device is used for local backup and it is stored locally at the office.

The third device is used for backup at appreciate times, and then the third and first devices are interchanged regularly at the bank vault. By using this method, there is always a copy in the vault and there is always a copy at the computer site.

By using an intelligent local attachable device, for example where the server component is integrated in the device, there is no risk of any virus or other malicious program to destroy data on purpose or by accident. This is possible since there is never a need to remove any information from the device. All files stored under the hashed name are never to be removed, in one embodiment. Likewise, the metadata files are never removed, in one embodiment. In one embodiment, the only time the system is updating them is when a specific version has disappeared, i.e. been changed or removed, and then the only information that needs to be added is the time for when that version ceased to exist. The device may be protected by hardware or software such that files may never be removed from the device by any commands from any attached computer or another device. There may be a physical switch or the requirement to enter a code physically on the backup device before any such data deletion can be made.

The embodiments of the invention in which an exclusive property or privilege is claimed are defined as follows:

1. A method implemented in a computer system including a memory, the method comprising:
    hashing a data block in a file comprising one or more data blocks;
    encrypting the data block;
    including the hash of the data block and encrypted key elements in a header associated with the encrypted data block;
    storing the encrypted data block and the header including the hash and the encrypted key elements in a memory on a computer system;
    using the hash of the data block in the header associated with the encrypted data block to identify redundant copies of the data block;
    receiving a request to access a particular file from the operating system;
    identifying the data blocks associated with the particular file, and locations of the data blocks, wherein the locations of the data blocks are on the computer system or on a remote system;
    transparently to the operating system, routing a subset of the data blocks responsive to the request through an encryption driver to decrypt the subset of the data blocks using the encrypted key elements prior to providing the requested data blocks to the operating system, thereby enabling the operating system to treat the encrypted data blocks as a readable file;
    providing backup system with an incremental backup, in which only those encrypted data blocks which have been changed are backed up;
    keeping an older version of the encrypted data block, when a newer version of the encrypted data block is added to the backup system; and
    enabling restoration of a prior version of a file from the backup system, to reverse changes made to the file, the restoration using the hash in the header of each of the encrypted data blocks to restore the prior version of the file.

2. The method of claim 1, wherein including the encrypted key elements in the header associated with the encrypted data block enables moving the encrypted data blocks to a different storage location.

3. The method of claim 1, further comprising:
    backing up the encrypted data block into a backup system, having a separate memory; and
    identifying duplicate encrypted data blocks encrypted with different encryption keys, based on the hash of the data block in the header of the encrypted data block.

4. The method of claim 3, further comprising:
    storing only a single copy of the encrypted data block in the backup system.

5. The method of claim 4, wherein if multiple copies of the encrypted data block are found in separate locations, the single copy of the encrypted data block is stored, and the multiple locations are added to the header.

6. The method of claim 4, further comprising:
    generating an index block on the backup system, the index block containing information of file names and hashes of unencrypted and encrypted data blocks, used to identify the data portion of the files.

7. The method of claim 6, wherein the data portions of the encrypted data blocks are stored in a separate location from the hash, the separate location identified in the header.

8. The method of claim 1, wherein when subportion of a particular data block is altered, the incremental backup only backs up the subportion of the particular data block.

9. The method of claim 1, further comprising:
    enabling a restoration of a system at a selected time, where the restoration restores versions of each encrypted data block from the selected time.

10. The method of claim 1, further comprising:
    hashing the encrypted data block;
    adding the hash of the encrypted data block to the header;
    using the hash of the data block and the hash of the encrypted data block to verify the validity of the encrypted data block, without accessing the data block.

11. The method of claim 1, further comprising:
    utilizing a plurality of encryption keys for encrypting various data blocks, the encryption key selected for a particular data block based on an intended use of the particular data block.

12. The method of claim 11, wherein a lower level key is used for less secure data blocks, and a higher level security is used for more valuable data blocks.

13. The method of claim 1, further comprising:
    using the hash as a file name for the encrypted data block, and using header to connect a logical name of the encrypted data block with the file name.

14. The method of claim 13, further comprising:
    building a tree directory structure of the file names using one or more characters for each directory node, and one or more levels, to speed up search.

15. An apparatus comprising:
    a processor to create one or more blocks from a file, and to hash each data block;
    the processor to encrypt the one or more data blocks;
    the processor to insert the hash and encrypted key element into a header associated with the encrypted data block, the hash in the header used to identify redundant copies of the data block and the encrypted key elements used in decrypting the data block;
    a memory to store the one or more encrypted data blocks and the associated header;
    an operating system to request the data blocks associated with the file; and
    an encryption driver to intercept the encrypted data blocks requested by the operating system, and decrypt the encrypted data blocks, using the encrypted key element, transparently to the operating system, allowing the operating system to treat the encrypted data blocks as a readable file;
    a backup system to provide incremental backup, the backup system to maintain a prior version of an encrypted data block, when an updated version of the data block is received;

the processor using the one or more encrypted data blocks in the backup system to restore of a prior version of a file, the file having been divided into the one or more encrypted data blocks, the processor using the hash in the header of each of the plurality of data blocks to restore the prior version of the file.

16. The system of claim 15, further comprising:

the processor to name each of the encrypted data block based on the hash associated with the encrypted data block to uniquely identify the data block.

17. The system of claim 15, further comprising:

a backup system in which the hashes are used as identifiers to quickly find objects and further to prevent redundant storing of objects.

18. The system of claim 17, further comprising:

the processor to receive at least one new encrypted data block for a new file, compare the new encrypted data block's hash with hashes of already backed up objects; and the processor to send the at least one new encrypted data block to the backup system only when no identical instances of the new encrypted data block are identified on the backup system based on the comparison.

19. The system of claim 17, further comprising:

the processor to restore one or more data blocks from the backup system, the restore decision function to use hashes to find the data blocks to restore.

20. The system of claim 15, further comprising:

a system driver to perform the encryption and decryption of the data blocks such that the encryption and the decryption are transparent to an operating system and to a user.

* * * * *